United States Patent
Haynes et al.

(10) Patent No.: US 7,875,177 B2
(45) Date of Patent: Jan. 25, 2011

(54) MEMBRANE LEAF PACKET WITH REINFORCED FOLD

(75) Inventors: Thomas N. Haynes, Eden Prairie, MN (US); Pam G. Hinton, Minneapolis, MN (US); Jon E. Johnson, Plymouth, MN (US); Thomas M. Lanz, Woodbury, MN (US); Abhishek Shrivastava, St. Paul, MN (US)

(73) Assignee: Dow Global Technologies Inc., Midland, MI (US)

( * ) Notice: Subject to any disclaimer, the term of this patent is extended or adjusted under 35 U.S.C. 154(b) by 272 days.

(21) Appl. No.: 12/330,975

(22) Filed: Dec. 9, 2008

(65) Prior Publication Data

US 2010/0140161 A1 Jun. 10, 2010

(51) Int. Cl.
*B01D 63/10* (2006.01)
*B01D 61/00* (2006.01)

(52) U.S. Cl. .......................... 210/321.85; 210/321.83; 96/4; 96/10

(58) Field of Classification Search ........................ None
See application file for complete search history.

(56) References Cited

U.S. PATENT DOCUMENTS

| | | | |
|---|---|---|---|
| 4,842,736 A | 6/1989 | Bray et al. | |
| 5,104,532 A * | 4/1992 | Thompson et al. | 210/224 |
| 5,114,582 A * | 5/1992 | Sandstrom et al. | 210/321.74 |
| 5,147,541 A | 9/1992 | McDermott, Jr. et al. | |
| 5,538,642 A * | 7/1996 | Solie | 210/652 |
| 5,681,467 A * | 10/1997 | Solie et al. | 210/486 |
| 6,068,771 A | 5/2000 | McDermott et al. | |
| 6,352,641 B1 | 3/2002 | Schmidt | |
| 7,303,675 B2 | 12/2007 | De La Cruz | |
| 7,335,301 B2 | 2/2008 | Cheng | |
| 2003/0034293 A1 | 2/2003 | Simonetti | |
| 2004/0124134 A1 | 7/2004 | Irie et al. | |
| 2005/0077229 A1 * | 4/2005 | Ishii | 210/321.83 |
| 2007/0068864 A1 | 3/2007 | De La Cruz et al. | |

FOREIGN PATENT DOCUMENTS

JP 10137558 5/1998

OTHER PUBLICATIONS

Tartan (TM) Box Sealing Tape 369, 3M, 2009.*

* cited by examiner

*Primary Examiner*—Krishnan S Menon
(74) *Attorney, Agent, or Firm*—Edward W. Black

(57) ABSTRACT

The present invention is directed toward membrane leaf packets, spiral wound modules and methods for making and using the same. The subject leaf packet comprises a membrane sheet folded upon itself and reinforced with sealant and tape along at least a portion of the fold on the back side of the membrane sheet.

8 Claims, 2 Drawing Sheets

MEMBRANE LEAF PACKET WITH REINFORCED FOLD

BACKGROUND OF THE INVENTION (1) Field of the Invention

The present invention is directed toward membrane leaf packets, spiral wound modules and methods for making and using the same.

(2) Description of the Related Art

Membrane leaf packets are a component of many types of spiral wound modules. Such leaf packets comprise a folded membrane sheet which may optionally include a feed spacer positioned between opposing membrane leaves of the packet. Spiral wound modules are typically made by winding one or more membrane leaf packets and permeate spacer(s) about a permeate collection tube. The step of folding a membrane sheet during construction of the membrane leaf packet often results in the formation of cracks or other defects which can lead to leaks and/or contamination. A variety of techniques for mitigating these deleterious effects have been proposed.

U.S. Pat. No. 4,842,736 highlights the limited effectiveness of tapes positioned along the front or back side of the membrane sheet along the fold. Such tapes are described as being prone to delaminating during module use or cleaning. This reference further describes a preferred use of sealants (e.g. urethanes) or a soft melt plastic ribbon applied to the back side of the membrane sheet in the fold area. Such sealants penetrate and seal the interstices or voids of the back side of the membrane sheet.

A known variant of the preceding technique is to cover the sealant on the back side of the membrane sheet with a plastic strip (e.g. Mylar). The plastic strip protects the sealant until cured.

U.S. Pat. No. 7,303,675 and US 2007/0068864 both disclose the application of sealants (e.g. urethanes) to the front side of the membrane sheet along the fold area.

U.S. Pat. No. 5,147,541 highlights the shortcomings of tapes (delaminating) and sealants (slow cure time) and describes an alternative means for reinforcing the fold comprising the application of a reinforcing strip to back side of the membrane sheet along with the application of heat and pressure to front side to "densify" and fuse layers in the fold area.

U.S. Pat. No. 7,335,301 highlights the shortcomings of "fusing" techniques; namely the length of time required to fuse the layers of the membrane sheet and proposes the use of UV curable sealants applied to the fold area.

U.S. Pat. No. 5,681,467 describes the use of thermal energy or swelling solvent to soften fold area prior to folding operation.

Due to its relative thickness (as compared with the leaf portion of a leaf packet), the bulk of the fold area limits the number of membrane leaf packets that can be effectively located about the permeate tube. Moreover, the fold of the leaf packet may limit the manner in which spiral wound modules are manufactured. For example, the use of exposed uncured sealant on the back side of the membrane sheet may limit the use of automated winding processes. That is, once applied to the fold the uncured sealant may be easily removed or "smeared" during the assembly of the spiral wound module. While the use of sealants on the front side of the membrane sheet may avoid this concern, sealants applied to the front side often result in tearing of the membrane surface once the sealant is cured. Unfortunately, tapes tend to delaminate from the front side of the membrane sheet.

Despite the known techniques for reinforcing the fold area of membrane leaves, each approach has shortcomings. An improved approach is desired which is adaptable to automated leaf and/or module manufacturing processes. Moreover, an improved fold reinforcing approach is desired which permits a greater number of membrane leaves to be effectively located about a permeate tube. The entire content of each of the aforementioned patents and patent applications are incorporated herein by reference.

BRIEF SUMMARY OF THE INVENTION

The present invention is directed toward membrane leaf packets, spiral wound modules and methods for making and using the same. The subject leaf packet comprises a membrane sheet folded upon itself and reinforced with sealant and tape along at least a portion of the fold on the back side of the membrane sheet.

DETAILED DESCRIPTION OF THE INVENTION

Figure 1:
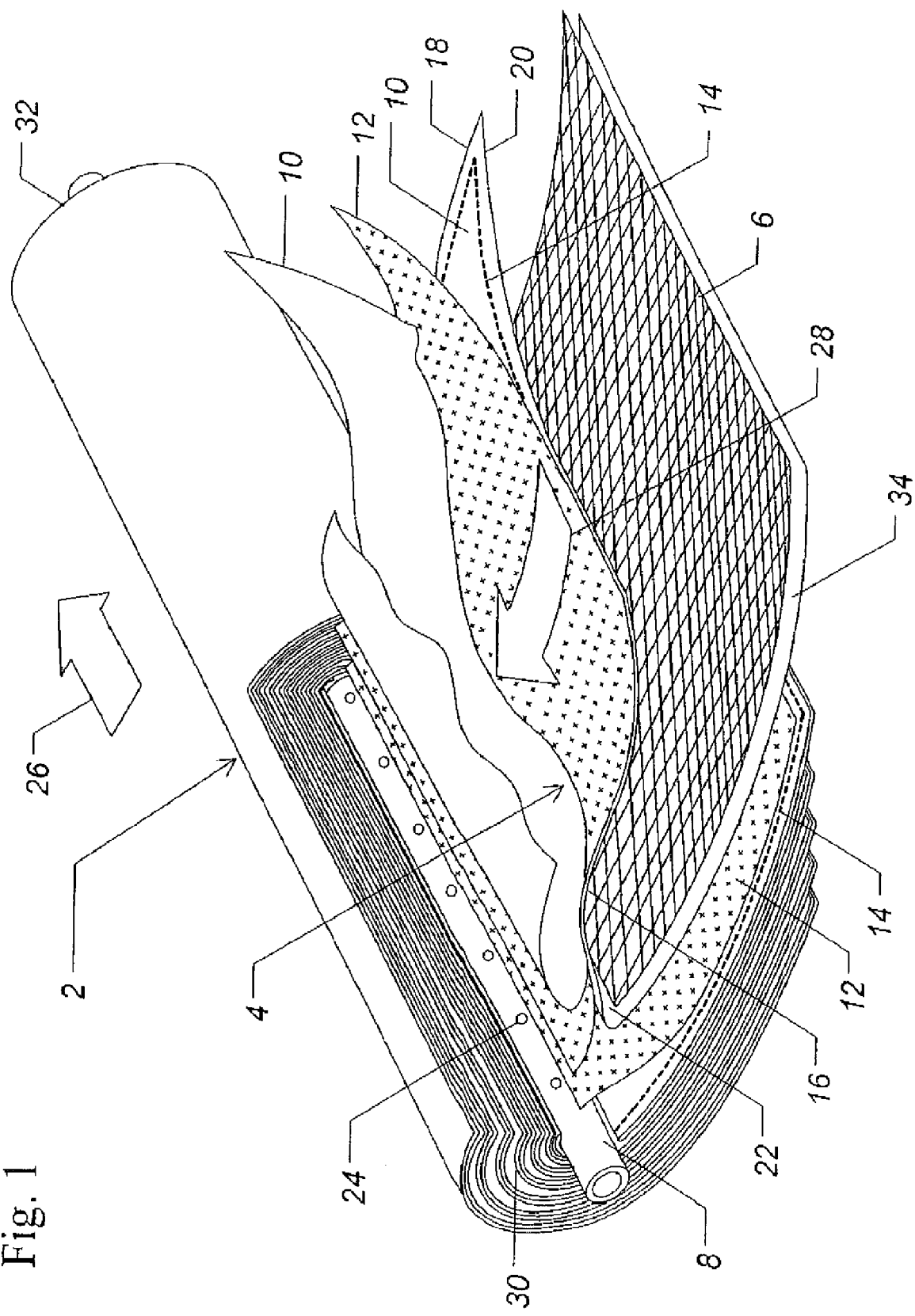
FIG. 1 is a perspective, partially cut-away view of a spiral wound module.

Membrane leaf packets have utility in the construction of spiral wound modules. In order to better understand the present invention, a brief overview of spiral wound modules is provided below.

Spiral wound modules (also referred to as "elements") are well known for use in a variety of fluid separations including both gas and liquid phase separations. Due to their spiral configuration, a relatively large membrane surface area can be packed into an individual module. Depending upon the specific membrane used, spiral wound modules can be used in a wide variety of applications including: reverse osmosis (RO), nanofiltration (NF), ultrafiltration (UF) and microfiltration (MF). Examples of common liquid separations include the treatment of liquid feeds such as the concentration and/or salt removal in food, dairy and sweetener feeds; desalination of water, removal divalent ionic species such as calcium and barium ions, and removal of larger constituents such as cysts, viruses, and pesticides. A typical module includes a permeate collection tube, at least one but preferably many membrane envelopes and an outer housing. While modules are available in a variety of sizes, one of the more common industrial RO modules is available with a standard 8 inch (20.3 cm) diameter and 40 inch (101.6 cm) length (8×40). For a typical 8 inch diameter module, 26 to 30 individual membrane envelopes are wound around the permeate collection tube (i.e. for permeate collection tubes having an outer diameter of from about 1.5 to 1.9 inches (3.8 cm-4.8)). In operation, four to eight modules are typically serially connected within a common pressure vessel. The individual modules within a vessel are typically of the same type, but different types of modules may be used, as described in US 2007/0272628 to Mickols et al. The outer housing of a module may include integral fluid seals to provide a seal within the pressure vessel as described in U.S. Pat. Nos. 6,299,772 and 6,066,254 to Huschke et al. Some types of modules may require special packaging to preserve performance during prolong storage, as described in U.S. Pat. No. 7,156,997 Marsh et al. Methods for testing modules are described in US 2008/0105038 to Jons et al. and US 2008/0202242 to Mickols et al. Specific examples of commercially available spiral wound modules include: BW30-440i brackish water module, SW30-XLE-400i sea water desalination module, and NF-400 nanofiltration module available from FilmTec Corporation.

A spiral wound module suitable for use in the present invention is generally shown at (2) in FIG. 1. The module (2) is formed by winding one or more membrane envelopes (4) and optional feed channel spacer sheet(s) ("feed spacers") (6) about a permeate collection tube (8). Each membrane envelope (4) preferably comprises two substantially rectangular membrane sheets (10) surrounding a permeate channel spacer sheet ("permeate spacer") (12). This sandwich-type structure is secured together, e.g. by sealant (14), along three edges (16, 18, 20) while the fourth edge (22) abuts the permeate collection tube (8) so that the permeate spacer (12) is in fluid contact with openings (24) passing through the permeate collection tube (8).

A membrane leaf packet is positioned on each side of the membrane envelope (4). Each leaf packet is shown comprising a substantially rectangular membrane sheet (10) folded upon itself to define two membrane "leaves" wherein the front sides (34) of each leaf are facing each other and the fold is axially aligned with the fourth edge (22) of the membrane envelope (4), i.e. parallel with the permeate collection tube (8). The feed spacer (6) is shown located between facing front sides (34) of the folded membrane sheet (10) and is open along its radial ends to permit feed fluid to flow in an axial direction (i.e. parallel with the permeate collection tube (8)) through the module. In this embodiment, the membrane envelope (4) is formed by joining the back sides of two adjacently positioned membrane leaves. While not shown, additional intermediate layers may also be included in the assembly.

Arrows shown in FIG. 1 represent the approximate flow directions (26, 28) of feed and permeate during operation. Feed flow (26) is from the inlet end (30) to the outlet end (32) across the front side (34) of the membrane. Permeate flow (28) is along the permeate spacer (12) in a direction approximately perpendicular to the feed flow (26). Actual flow paths vary with details of construction and operating conditions.

During module fabrication, permeate spacers (12) are attached about the circumference of the permeate collection tube (8) and membrane leaves are interleaved therebetween. The back sides of adjacently positioned membrane leaves are sealed about portions of their periphery (16, 18, 20) to enclose the permeate spacer (12), i.e. form the membrane envelope (4). The membrane envelope(s) (4) and feed spacer(s) (6) are wound or "rolled" about the permeate collection tube and then held in place such as by tape (e.g. self adhering mesh tape) or other means until an outer housing can be secured about the partially constructed module (2). The sealant used for sealing the edges of the membrane envelope preferably permits relative movement of the various sheet materials during the winding process. That is, the cure rate or period of time before which the sealant becomes tacky is preferably longer than that required to assemble and wind the membrane envelopes and membrane leaves about the permeate collection tube.

Materials for constructing various components of spiral wound modules are well known in the art. Suitable sealants for sealing membrane envelopes include urethanes, epoxies, silicones, acrylates, hot melt adhesives and UV curable adhesives. While less common, other sealing means may also be used such as application of heat, ultrasonic welding and tape. Permeate collection tubes are typically made from plastic materials such as acrylonitrile-butadiene-styrene, polyvinyl chloride, polysulfone, poly(phenylene oxide), polystyrene, polypropylene, polyethylene or the like. Tricot polyester materials are commonly used as permeate spacers. Representative feed spacers are described in more detail in U.S. Pat. No. 6,881,336 to Johnson. Representative example feed spacers include polyethylene, polyester, and polypropylene mesh materials such as those commercially available under the trade name VEXAR™ from Conwed Plastics. The housing may be constructed from a variety of materials including stainless steel, tape and PVC material; however the most common module housing material is made from fiber reinforced plastics, e.g. long glass fibers coated with a thermoplastic or thermoset resin. During module fabrication, long glass fibers are wound about the partially constructed module and resin (e.g. liquid epoxy) is applied and hardened. The ends of modules are often fitted with an anti-telescoping device or end cap (not shown) designed to prevent membrane envelopes from shifting under the pressure differential between the inlet and outlet ends of the module. The end cap is commonly fitted with an elastomeric seal (not shown) to form a tight fluid connection between the module and an external pressure vessel (not shown). Examples of end cap designs are described in U.S. Pat. No. 6,632,356 to Hallan, et al., including FilmTec Corporation's iLEC™ interlocking end caps. Additional details regarding various components and construction of spiral wound modules are provided in the literature, see for example: U.S. Pat. No. 5,538,642 to Solie describes a technique for attaching the permeate spacer to the permeate collection tube, WO 2007/067751 to Jons et. al describes trimming operations and the use of a UV adhesive for forming a insertion point seal, and U.S. Pat. No. 5,096,584 to Reddy et al. describes various embodiments, components and construction techniques particularly suited for gas separations.

For purposes of the present invention, the type of membrane sheet is not particularly laim1ted. The selection of membrane sheet is dependant upon the specific application, feed source, solute, and foulants. While early RO and NF flat sheet membranes were made from cellulose acetate materials, asymmetric polysulfone and polyethersulfones membranes along with composite membranes have become more common in recent years. One preferred composite membrane sheet is FilmTec Corporation's FT-30™ membrane which comprises a bottom layer (back side) of a nonwoven polyester material web (e.g. PET scrim), a middle layer of a microporous polymer such as polysulfone having a thickness of about 25-125 microns, and top layer (front side) comprising a thin film polyamide layer having a thickness less than about 1 micron and more commonly from about 0.010 to 0.1 micron. The polyamide layer is preferably created by an interfacial polycondensation reaction between a polyfunctional amine monomer and a polyfunctional acyl halide monomer upon the surface of the microporous polysulfone as described in U.S. Pat. Nos. 4,277,344 and 5,658,460 to Cadotte et al; and U.S. Pat. No. 6,878,278 to Mickols. Methods of modifying such polyamide membranes are described in U.S. Pat. No. 5,876,602 to Jons et. al.; U.S. Pat. Nos. 5,755,964, 6,280,853 and WO 2007/133362 to Mickols; U.S. Pat. Nos. 4,888,116; 4,765,897; 4,964,998 to Cadotte et. al. and US 2007/0251883 and US 2008/0185332 to Niu et al.

Figure 2:
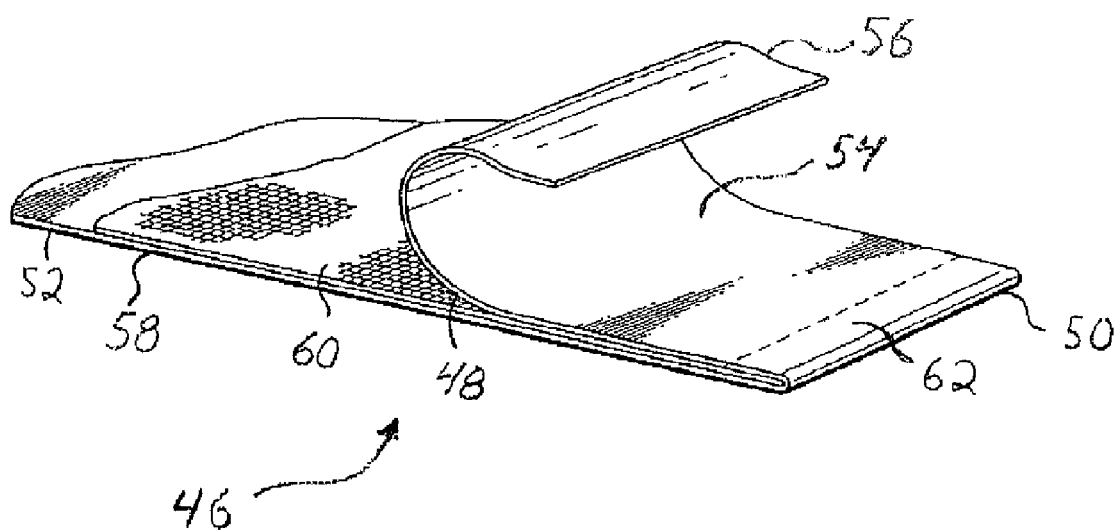
FIG. 2 is perspective, partially cut-away view of a membrane leaf packet.

A representative membrane leaf packet is generally shown at (46) in FIG. 2. The leaf packet (46) comprises a membrane sheet (48) folded upon itself (fold (50)). The membrane sheet (48) comprises a front (52) and back side (54). The membrane sheet (48) is folded upon itself so that the front sides (52) of the membrane sheet (48) face one another. In a preferred embodiment, the front side (52) comprises the primary separation surface which contacts feed fluid; whereas the back side (54) provides overall support for the membrane sheet (48) and faces in a direction opposite from the feed fluid. While the membrane sheet (48) may have a variety of shapes, the sheet preferably comprises a rectangular flat sheet. The fold (50) defines a longitudinal axis along a width of the membrane sheet (48). The "fold area" refers to the fold (50) and directly adjacent areas that may be structurally compromised by the act of folding and subsequent assembly. While dependant upon the specific membrane sheet and folding technique, the fold area typically extends a few millimeters (in a perpendicular direction) from the longitudinal axis of the fold (50). The portions of the membrane sheet (48) extending perpendicularly from the fold (50) are referred to herein as membrane leaves (56/58) and are preferably of approximately equal length, which may be less than, equal to or longer than the axial length of the fold (50) (i.e. width of the membrane sheet). In preferred embodiments, a feed spacer (60) is positioned within the membrane leaf packet, i.e. "sandwiched" between membrane leaves (56/58) to facilitate flow of feed fluid along the front sides (52) of the membrane sheet (48). The use of feed spacers (60) is optional. Alternative feed channeling structures may also be used including ridges, channels or raised surfaces running along the front sides of the membrane sheet. Tape (62) is provided along the fold (50) on the back side (54) of the membrane sheet (48) and preferably extends beyond the fold area (i.e. in a direction perpendicular to the axis of the fold (50)). While not shown, a sealant is preferably applied on the back side (54) of the membrane sheet (48) along the fold (50) which is covered by the tape (62). The tape (62) provides initial reinforcement of the fold (50) and serves to cover the sealant during leaf or module fabrication. The sealant, once cured, provides reinforcement in the fold area and provides protection against cracking, blistering or other defects of the membrane sheet (48) in the fold area.

The sealant (sometimes also referred to in the literature as "glue" or "adhesive") is preferably provided in the form of a flowable viscous liquid but can be provided in other forms such as a paste, meltable strip and the like. When provided as a viscous liquid, the viscosity should be sufficiently high to allow the adhesive to be easily applied, i.e. not "run" from the location of application nor excessively extrude from beyond the fold area during fold formation, compression or module winding or "rolling" operations. Moreover the viscosity should be sufficiently low to permit at least partial penetration into the membrane sheet prior to cure. In general, the viscosity of the sealant should be less than about 50,000 cP and in order of increasing preference, less than about; 25,000 cP; 10,000 cP; 5,000 cP; 2,500 cP and in some embodiments less than about 1500 cP. A suitable range of sealant viscosity is from typically about 100 to about 50,000 cP, preferably from 500 to about 10,000 cP and more preferably from about 700 to 5,000 cP. In order to provide beneficial movement (i.e. "slippage") between membrane sheets during module rolling, the sealant preferably has a cure time longer than that required to complete module rolling operations. This time period may vary significantly as a function of module fabrication technique. For example, automated rolling processes may be completed in minutes whereas tradition manual rolling may take over an hour depending upon the specific module construction. Once cured, the sealant should be flexible. Sealants forming too rigid of a structure can result in tearing of the membrane sheet during operation. The technique for applying the sealant to the fold area is not particularly laim1ted and will typically depend upon the selection of sealant and details regarding the membrane rolling process. Application techniques include brushing, spraying, roll coating, slot die coating and the like. One preferred technique involves extrusion via a nozzle applicator. The sealant may be applied directly to the back side of the membrane sheet prior to, during or after the fold has been formed. Alternatively, the sealant may be applied to the tape (adhesive side) prior to applying the tape to the membrane sheet. For example, the sealant may be extruded via a point nozzle to form a bead (e.g. of approx. 6 mm in width) along a central axis of tape which is subsequently adhered to the back side of a membrane sheet prior to, during or after formation of a fold. The sealant and tape preferably extend along the entire length of the fold. Such a process may be automated.

The selection of sealant is not particularly laim1ted and is typically based upon the specific module construction and fabrication process. Examples include hot melt adhesives, urethanes, epoxies, and silicones; however urethanes are preferred in most embodiments. The intended end use of the module may restrict selection of appropriate sealants. For example, many applications require governmental approved sealants, (e.g. FDA approved).

During the step of applying the tape to the membrane sheet, the sealant is typically spread in perpendicular directions from the fold to define a "spreading area" having a width typically ranging from about 8 to 50 mm (i.e. about 4 to 25 mm in opposite perpendicular directions from the longitudinal axis of the fold), but more preferably from about 18 to 24 mm. Once spread, the applied wet coating average thickness of sealant is preferably less than about 0.25 mm, and more preferably less than about 0.10 mm. Applied wet coating average thickness may be calculated by determining the total quantity of sealant per "spreading area". Alternatively, such thicknesses may be experimentally determined via microscopy or other well known analytical techniques. While the actual thickness of applied sealant across the spreading area may vary, the thickness is preferably relatively uniform across the spreading area.

The tape used for reinforcing the fold of the membrane leaf is preferably a flexible strip or band of material (e.g. polyester, polypropylene, etc.) comprising a front side including a pressure sensitive adhesive (e.g. acrylic, synthetic rubber resin, etc.) and a back side. The tape is preferably wider than the fold area. The tape is also preferably wider than the spreading area of sealant so that that the pressure sensitive adhesive on the front side of the tape can directly contact the back side of the membrane leaf (i.e. in an area beyond the peripheral edge of the spreading area of the sealant). The width of the fold area, tape and spreading area of sealant are all highly dependant upon the specific manufacturing process, materials of construction and application. In several applications, a tape width of approximately 48 mm has been found suitable for membrane leaves having a fold region of about 4 mm and a "spreading area" of sealant of less than about 30 mm. In a preferred embodiment, the back side surface of the tape has a co-efficient of friction (as measured by ASTM D1894-06 using the back side surfaces of two identical samples of tape) of less than about 0.42, preferably less than about 0.4, more preferably less than about 0.35, and still more preferably less than about 0.3. In order to decrease the bulk of the fold area, tapes are preferably relatively thin, i.e. less than about 1 mm thick, more preferably less than about 0.1 mm, and still more preferably less than about 0.05 mm. In order to facilitate automated leaf manufacturing processes, the tape preferably has uniform tear strength. An example of suitable tape is Tartan™ 369 general purpose box sealing tape commercially available from 3M Corporation. For some applications, the tape may also need to be certified or governmentally approved for specific uses.

The membrane leaf packet may be assembled by hand but the assembly process is preferably automated. By way of example, the membrane sheet may be folded such as by use of a heated mandrel. Sealant is preferably applied to the front side (adhesive side) of a section of tape which then applied along the back side surface of the membrane sheet along the entire length of the fold. The folding and taping steps may be performed while the membrane sheet remains part of a roll, or after the membrane sheet has been cut into appropriately sized panels. Application of sealant is preferably by way of an automated coating process wherein sealant coverage can be closely controlled. Tape and membrane sheets may be provided in long rolls. Once formed, a feed spacer may be positioned between the leaves of the membrane leaf packet. The feed spacer may be provided from a continuous roll as part of an automated process wherein the feed spacer is cut to length during leaf packet assembly. The leaf packet may be inserted between sheets of permeate spacer that are pre-attached to the permeate collection tube. To prevent gaps and possible leakage, the fold of the inserted leaf packet is positioned as close to the permeate collection tube as possible.

The number of membrane leaf packets included per module can be described in terms of "leaf density." For purposes of the present description, the term "leaf density" means the number of membrane leaf packets per unit length (inch) of circumference about the permeate collection tube. Automated manufacturing techniques allow for the production of modules having relatively higher leaf densities; however, the bulk and related properties of the fold area of each leaf packet (among other factors) imposes a laim1tation on leaf density—particularly in the context of highly automated module manufacturing processes including those that fabricate membrane leaf packets in situ with uncured sealant as part of an integrated module manufacturing process. For example, for modules including membrane leaf packets with back side reinforcement (i.e. sealant and plastic strips), it is often difficult to consistently achieve a leaf density greater than about 6 membrane leaf packets per inch (2.36 packets per cm) of permeate tube circumference. At higher leaf densities, friction forces between the back side surface of the membrane sheet (along the fold) and adjacently positioned permeate spacers prevent full insertion of the membrane leaf packet. Misalignment or incomplete insertion of a membrane leaf packet along the entire fold can result in leakage. This problem is exacerbated with manufacturing processes utilizing uncured sealant wherein the sealant functions as a lubricant permitting gaps to form as the inserted leaf packet slides away from the permeate collection tube. With specific regard to embodiments utilizing sealant and protective plastic strips, the compressive forces associated with higher leaf densities can dislodge the leaf after insertion resulting in problematic misalignments. Moreover, the friction forces associated with higher leaf densities can also dislodge the protective plastic strip from the fold area, thus exposing uncured sealant. As part of the present invention, the use of tapes including pressure sensitive adhesives can avoid such dislodgement along with the corresponding exposure of uncured sealant. However, friction forces between the back side of the tape and adjacently positioned permeate spacers can still prevent full insertion and/or proper alignment of the membrane leaf packet during module construction, particularly at higher leaf densities, e.g. higher than about 7 (2.76 packets/cm), 7.5 (2.95 packets/cm), 8 (3.15 packets/cm) and particularly 8.5 (3.35 packets/cm). In order to achieve such higher leaf densities, tapes having low friction back side surfaces are preferred. More specifically, tapes having back side surface having a co-efficient of friction of less than about 0.42, preferably less than about 0.4, more preferably less than about 0.35 and still more preferably less than about 0.3 (as measured by ASTM D1894-06).

The present invention further includes a spiral wound module including a permeate collection tube and a plurality of membrane leaf packets and membrane envelopes as previously described. In a preferred embodiment, the module has a leaf density of at least about 6 (i.e. at least about six membrane leaf packets per inch of circumference of the permeate collection tube), preferably at least about 7 (2.76 packets/cm), more preferably at least about 7.5 (2.95 packets/cm), and in some embodiments at least about 8 (3.15 packets/cm) and even 8.5 (3.35 packets/cm). The modules preferably include membrane leaf packets with sealant and tape provided along the back side of the membrane sheet along the fold, as previously described. The tape preferably has a back side with a coefficient of friction less than about 0.42, preferably less than 0.4, more preferably less than about 0.35 and still more preferably less than about 0.3 as measured according to ASTM D1894-06.

Throughout the description reference has been made to ASTM D1894-06. This standard test method is based upon a standard sample size (i.e. 2 inch width). For purposes of the present description, it should be understood that this same general test method can be used for samples having widths other than 2 inches. For example, many tapes suitable for use in the present invention may be commercially available in widths from about 1 to 3 inches (2.54-7.62 cm). For purposes of the present invention, the width of such tapes has no material impact upon the determination of the coefficient of friction according to ASTM D1894-06. That is, the general testing methodology of ASTM D1894-06 is a preferred means for determining the coefficient of friction regardless of sample width—particularly for the tape widths most suited for the present invention (i.e. widths from about 1 to 3 inches (2.54-7.62 cm), more preferably 1.5 to 2.5 inches (3.81-6.35 cm)). For purposes of this description, coefficient of friction values for each tape is based upon a tape reference of the same material, i.e. the friction was measured between the back side surfaces of two identical tape samples.

EXAMPLES

In order to better illustrate various aspects of the invention, an attempt was made to construct a spiral wound module using conventional membrane leaf packets with each leaf packet including urethane sealant and a plastic Mylar strip along the back side of the membrane sheet along the fold. However, rather than construct a conventional module having a leaf density of about 5 or 6, a leaf density of 8.8 was attempted. If successful, this module would include 97 individual membrane leaf packets. As shown below, construction of this module failed after insertion of only 14 membrane leaf packets.

Additional spiral wound modules were prepared but with the plastic Mylar strip replaced with one of four different tapes. Each tape included a back side surface having a different coefficient of friction, (i.e. Tape A=0.322; Tape B=0.412; Tape C=0.282; Tape D=0.265). Other than the tapes used to reinforce the folds of membrane leaf packets, all other components and methods of construction were the substantially identical for all of the modules. Each module included a permeate collection tube having an outer diameter of approximately 89 mm (3.5 inch). Membrane leaf packets were prepared using FT-30 type composite membrane flat sheet having a thickness of approximately 0.15 mm (6 mil) and a polypropylene mesh feed spacer having a thickness of approximately 0.7 mm (28 mil). The membrane leaf packets used in all the examples were substantially the same as those used in commercially available spiral wound modules such as FilmTec's commercial SWHR-LE 400 module. The membrane sheets were folded by use of a mandrel. For each membrane leaf packet, urethane sealant (viscosity of approximately 22,000 cP) was applied to a tape having an approximate width of 48 mm (1.875 in) which was subsequently compressed against the back side surface of the membrane sheet along the fold. The resulting wet coating average application rate of sealant was approximately 3.2 mm$^3$/mm (0.005 in$^3$/in) having an approximate width of about 12 to 15 mm along the entire length of the fold (approximately fold length of 900 mm).

For each spiral wound module, permeate spacers were attached about the outer circumference of the permeate collection in equal distant spacing via ultrasonic welding. In each case, a FREFLOW™ Tricot polyester sheet was used as the permeate spacer. The permeate spacer had a thickness of approximately 0.25 mm (10 mils) with 60 wales per inch.

Once the permeate spacers where attached about the permeate collection tube, individual membrane leaf packets were inserted between adjacent permeate spacers so that the fold of each leaf packet was closely aligned with the permeate collection tube. The number of successfully inserted membrane leaf packets for each module was measured and is provided in Table 1 below. In each case, the use of tape rather than a Mylar strip resulted in a higher number of successful leaf packet insertions. Moreover, the use of tapes having back side surfaces with lower average coefficients of friction resulted in a higher number of successful leaf packet insertions.

TABLE 1

|  | Mylar strip | Tape A | Tape B | Tape C | Tape D |
|---|---|---|---|---|---|
| Average Coefficient of Friction (standard deviation) |  | 0.322 (0.013) | 0.412 (0.082) | 0.282 (0.024) | 0.265 (0.015) |
| No. of membrane leafs prior to failure | 14 | 50 (Avg. 66 & 35) | 40 (Avg. 35 & 45) | all leaves inserted | all leaves inserted |

Coefficient of friction values were measured in accordance with ASTM D1894-06 but modified by using tapes having widths of approximately 48 mm (1.875 inch) inch rather than 2.0 inch (5.08 cm). Coefficient of friction values for each tape were determined based upon using a tape reference of the same material, i.e. the friction was measured between the back side surfaces of two identical tape samples. In each instances, three samples of each tape were tested with the average value and standard deviation reported.

While much of the detailed description of membrane leaf packets and spiral wound modules has focused upon traditional RO and NF applications, those skilled in the art will readily appreciate the applicability to other spiral wound modules including but not limited to those directed toward UF, MF, electro-dialysis, electro-deionization along with modules designed for gas separation and non-aqueous liquid feeds. The applicable spiral wound modules are not particularly limited and many different configurations and sizes are applicable to the invention. For example, in a preferred embodiment, discrete membrane sheets of two adjacently positioned membrane leaves are utilized to construct a membrane envelope. However, in one alternative embodiment, the membrane sheet may be continuous and folded back upon itself to create an alternating leaf and envelope as described in U.S. Pat. No. 5,538,642 to Solie. Moreover, a wide variety of membrane sheets may be used beyond those specifically described. It should be understood that the intent of this description is not to limit the invention to the particular embodiments described, but rather to cover all modifications, equivalents, and alternatives falling within the spirit and scope of the disclosure. Many embodiments of the invention have been described and in some instances certain embodiments, selections, ranges, constituents, or other features have been characterized as being "preferred". Such designations of "preferred" features should in no way be interpreted as an essential or critical aspect of the invention.

The entire content of each of the aforementioned patents and patent applications are incorporated herein by reference.

The invention claimed is:

1. A membrane leaf packet adapted for use within a spiral wound module comprising:
   a membrane sheet comprising a first and second side, the membrane sheet folded to define a first and second membrane leaf extending from a fold;
   a sealant having a viscosity of less than about 50,000 cP located on the back side of the membrane sheet along at least a portion of the fold; and
   a tape comprising a front and back side, wherein the back side has a surface with a co-efficient of friction of less than about 0.42, wherein the tape is located on the back side of the membrane sheet along at least a portion of the fold and covers the sealant on the back side of the membrane sheet.

2. The membrane leaf packet of claim 1 wherein the tape comprises a front and back side, wherein the back side has a surface with a co-efficient of friction of less than about 0.35.

3. The membrane leaf packet of claim 1 wherein the tape comprises a front and back side, wherein the front side includes a pressure sensitive adhesive and the back side has a surface with a co-efficient of friction from less than 0.3.

4. A method for making a membrane leaf packet comprising:
   providing a membrane sheet having a first and second side;
   folding the membrane sheet to define a first and second membrane leaf extending from a fold;
   providing a sealant having a viscosity of less than about 50,000 cP;
   providing a tape comprising a front and back side wherein the back side has a surface with a co-efficient of friction of less than about 0.42; and
   applying the sealant and the tape along at least a portion of the fold such that the tape covers the sealant on the back side of the membrane sheet.

5. The method of claim 4 wherein the sealant is first applied to a section of the front side of the tape and the tape is subsequently applied along at least a portion of the fold.

6. A spiral wound module comprising a plurality of membrane leaf packets and membrane envelopes wound about a permeate collection tube, wherein the membrane leaf packet comprises:
- a membrane sheet comprising a first and second side, the membrane sheet folded to define a first and second membrane leaf extending from a fold;
- a sealant having a viscosity of less than about 50,000 cP located on the back side of the membrane sheet along at least a portion of the fold; and
- a tape located on the back side of the membrane sheet along at least a portion of the fold and covering the sealant wherein the tape comprises a front and back side and wherein the back side has a surface having a co-efficient of friction of less than about 0.42.

7. The module of claim 6 wherein the back side of the tape has a surface having a co-efficient of friction of less than about 0.35.

8. The module of claim 6 wherein the module is characterized by having a leaf density of at least about 7.

* * * * *